United States Patent
Simonen

(10) Patent No.: US 6,442,260 B1
(45) Date of Patent: Aug. 27, 2002

(54) METHOD AND SYSTEM FOR TRANSMITTING INFORMATION TO A TELECOMMUNICATION TERMINAL

(75) Inventor: Ari-Pekka Simonen, Jyväskylä (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/817,855

(22) Filed: Mar. 26, 2001

Related U.S. Application Data

(63) Continuation of application No. PCT/FI99/00780, filed on Sep. 22, 1999.

(30) Foreign Application Priority Data

Sep. 24, 1998 (FI) .................................................. 982062

(51) Int. Cl.⁷ ............................................. H04M 15/00
(52) U.S. Cl. ............. 379/130; 379/114.01; 379/114.07; 379/122; 379/143; 379/144.08
(58) Field of Search ................................ 379/114, 130, 379/131, 112, 121, 144, 122, 143; 455/407, 408, 405, 406, 432, 433, 560

(56) References Cited

U.S. PATENT DOCUMENTS

| | | | | |
|---|---|---|---|---|
| 5,303,297 A | * | 4/1994 | Hillis | 379/63 |
| 5,519,769 A | * | 5/1996 | Weinberger et al. | 379/112 |
| 5,608,788 A | * | 3/1997 | Demlow et al. | 379/142 |
| 5,809,122 A | * | 9/1998 | Jang | 379/140 |
| 5,822,411 A | * | 10/1998 | Swale et al. | 379/111 |
| 5,828,737 A | * | 10/1998 | Sawyer | 379/114 |
| 6,002,755 A | * | 12/1999 | Krank et al. | 379/130 |
| 6,023,499 A | * | 2/2000 | Mansey et al. | 379/111 |
| 6,104,792 A | * | 8/2000 | Lautenschlager et al. | 379/114 |
| 6,157,648 A | * | 12/2000 | Voit et al. | 370/401 |
| 6,195,543 B1 | * | 2/2001 | Granberg | 455/407 |
| 6,263,058 B1 | * | 7/2001 | Lautenschlager et al. | 379/114 |

FOREIGN PATENT DOCUMENTS

| | | | | |
|---|---|---|---|---|
| CA | 2180173 | * | 6/1996 | H04M/3/42 |
| CA | 2180173 | | 12/1996 | H04M/3/42 |
| DE | 19522988 | | 1/1997 | H04M/15/00 |
| DE | 0751662 | * | 2/1997 | H04M/15/00 |
| EP | 0 647 055 A1 | | 4/1995 | H04M/15/28 |
| EP | 0 647 055 A1 | * | 5/1995 | H04M/15/28 |
| WO | 94/28670 | | 12/1994 | H04M/15/16 |
| WO | WO 94/28670 | * | 12/1994 | H04M/15/16 |
| WO | 98/52344 | | 11/1998 | H04M/15/28 |
| WO | 98/59504 | | 12/1998 | H04Q/7/22 |

\* cited by examiner

*Primary Examiner*—Binh Tieu
(74) *Attorney, Agent, or Firm*—Altera Law Group, LLC

(57) ABSTRACT

Method and system for presenting the price of a telecommunication connection on the telecommunication terminal of the committer of the telecommunication connection in a telecommunication system comprising a telephone exchange, a telecommunication terminal communicating with the telephone exchange via a telecommunication network and a billing center which takes care of charge calculation in the network and is connected to the telephone exchange. According to the invention, connection-specific advice-of-charge data is transmitted to the telecommunication terminal at the beginning of the telecommunication connection, using the telecommunication terminal, a price for the telecommunication connection is calculated from the advice-of-charge data; and the calculated price of the telecommunication connection is presented on the telecommunication terminal.

28 Claims, 2 Drawing Sheets

METHOD AND SYSTEM FOR TRANSMITTING INFORMATION TO A TELECOMMUNICATION TERMINAL

Figure 1:
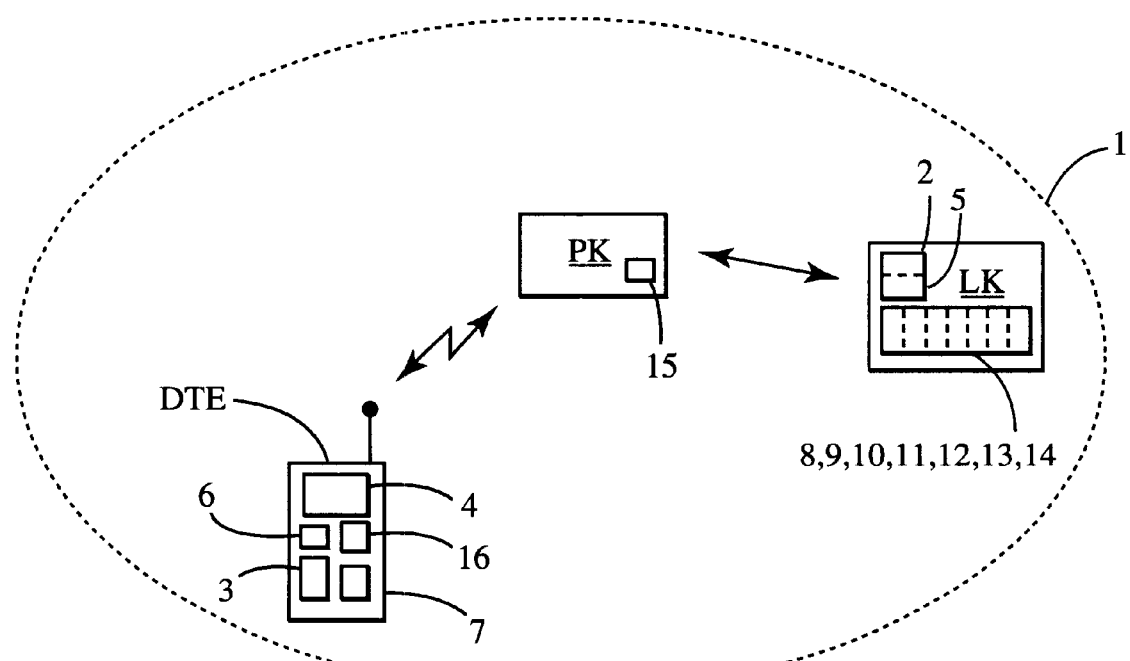

This application is a con't of PCT/FI99/00780 filed Sep. 22, 1999.

FIELD OF THE INVENTION

The present invention relates to telecommunication technology. In particular, the invention concerns a new and improved method and system for presenting the cost of a telecommunication connection on data terminal equipment.

BACKGROUND OF THE INVENTION

A prior-art practice is to use a standardised Advice Of Charge (AOC) auxiliary service to present call price information to the committer of a connection. The auxiliary service is in use at least in ISDN networks (ISDN, Integrated Services Digital Network) and in digital mobile communication networks. In a mobile communication network, the advice-of-charge auxiliary service presents call cost information preferably on the display of a mobile station in accordance with call price data stored in the memory locations of the subscriber identity module (SIM). In an ISDN network, the advice-of-charge auxiliary service is available at an ISDN basic rate interface, at an ISDN primary rate interface and at a V5 interface.

In an ISDN network, the advice-of-charge auxiliary service is divided into three services (AOC-S, AOC-D, AOAC-E). Services corresponding to these are also implemented in many mobile communication systems. AOC-S (Advice Of Charge—charging information at call Set-up time) serves to send rate based charging information to the terminal at call set-up time as well as during the call if the rates vary. AOC-D (Advice Of Charge—charging information During the call) serves to send to the terminal information regarding the bill accumulated for a connection so far, during the connection and at its end. In the AOC-E (Advice Of Charge—charging information at the End of the call) service, information giving the total price accumulated for a connection at the end of the connection.

AOC-S and AOC-D are applicable for all telecommunication services. AOC-E is applicable for all circuit-switched telecommunication services. Auxiliary services do not replace or complement the call charge measurement performed by the network.

In the above-described presentation of call cost information to the committer of a telecommunication connection by transmitting cost data to his/her telecommunication terminal over the network, a problem is the network capacity occupied in the transmission of these data. If the subscriber wants real-time information regarding the price of his/her call, then price information must be sent to him/her continuously. This requires plenty of capacity.

The object of the present invention is to eliminate the drawbacks described above or at least to significantly reduce them.

A specific object of the present invention is to disclose a new type of method and system for presenting cost information to the user of a telecommunication terminal.

As for the features characteristic of the invention, reference is made to the claims.

BRIEF DESCRIPTION OF THE INVENTION

In the method of the invention, the cost of a telecommunication connection is presented on the subscribe's telecommunications terminal in a telecommunication system comprising a telephone exchange and a telecommunication terminal communicating with the telephone exchange over a telecommunication network. Furthermore, the telecommunication system comprises a billing centre, which takes care of charge calculation for telecommunication connections and communicates with the telephone exchange. Based on the charge calculation, the subscribers in the telecommunication network are charged for telecommunication connections and services used.

According to the invention, connection-specific advice-of-charge data is transmitted to the subscriber's telecommunication terminal at the beginning of a telecommunication connection and, from the advice-of-charge data, the price of the telecommunication connection is calculated by means of the telecommunication terminal. Further, according to the invention, the calculated real-time price of the telecommunication connection is presented on the telecommunication terminal.

In an embodiment of the method, the advice-of-charge data comprises advice-of-charge parameters and a formula describing the development of the cost of the telecommunication connection. The advice-of-charge parameters comprise all the parameters presented in the formula describing the development of the cost. If the telecommunication terminal is provided with a clock and the terminal measures the amount of data transmitted, when the only advice-of-charge parameters needed are charge per data unit and possible rate changes according to the time of day.

In some systems, such as the UMTS (Universal Mobile Telephone System) several telecommunication connections can be set up simultaneously for a single telecommunication terminal. Separate connections may be simultaneously active e.g. for speech and video. In this case, a connection-specific cost can be calculated for each telecommunication connection and the charge for each connection can be presented separately on the telecommunication terminal. Furthermore, the total price accumulated from all telecommunication connections can be calculated in the terminal and presented on its display.

In a preferred embodiment of the method, the billing centre is a service provider. In this case, the service provider charges the subscriber directly for telecommunication services used. This may apply e.g. to the future UMTS (Universal Mobile Telephone System) mobile communication system. The service provider is part of the telecommunication system and is also connected to the telephone exchange. A service provider acting on the basis of an agreement generally charges the subscriber directly for services used. The billing centre may also be a telephone exchange.

In an embodiment or the method, the cost calculation carried out in the telecommunication terminal is corrected and modified with updated advice-of-charge data during the connection. Updates are generated in the billing centre every time when the advice-of-charge parameters change or when the user wants to check whether the sum produced by the calculation performed by the terminal equipment is the same as the amount to be charged for the connection.

In an embodiment of the method, updated advice-of-charge data is transmitted to the telecommunication terminal when the rate for a telecommunication connection is changed, when the bandwidth reserved for the telecommunication connection is changed, upon the subscriber's request and/or periodically at intervals of a predetermined length.

If some part of the advice-of-charge data cannot be transmitted to the telecommunication terminal, e.g. if the price information given by the service provider is not of a format that would allow it to be included in the formula or if the information is otherwise not received, then a notice of this circumstance could also be transmitted to the telecommunication terminal. The message to be transmitted to the terminal could contain an indication of what part of the advice-of-charge data is missing. This would obviate indeterminate situations in the telecommunication terminal, in other words, the terminal would not expect advice-of-charge data that is not available. On the other hand the user would also be informed about the situation and would not remain waiting for price information.

In an embodiment of the method, the price for a telecommunication connection calculated by the terminal is updated by the price calculated by the billing centre and charged from the subscriber. The billing centre can also be programmed to transmit the cost accumulated for the telecommunication connection as calculated by the billing centre to the telecommunication terminal at the end of the connection.

In an embodiment of the method, the subscriber is charged for a telecommunication connection on the basis of the charge calculation performed by the billing centre. Thus, the price suggested by the terminal does not replace the charge calculation performed by the network operator.

In an embodiment of the method, the advice-of-charge data is transmitted to the telecommunication terminal using advice-of-charge (AOC) auxiliary services.

In an embodiment of the method, the transmission to the telecommunication terminal of advice-of-charge data is activated automatically for all calls by the billing centre, for each telecommunication terminal or for each call via activation by the subscriber.

In an embodiment of the method, the telecommunication system is a digital mobile communication system. In this case, the telephone exchange is a mobile services switching centre, the telecommunication terminal is a mobile station and the price is preferably presented on the display of the mobile station.

The system of the invention for presenting the cost of a telecommunication connection on the telecommunication terminal of the committer of the telecommunication connection in a telecommunication system comprises a telephone exchange and a telecommunication terminal communicating with the telephone exchange over a telecommunication network. Connected to the telephone exchange is a billing centre, which takes care of charge calculation in the network. Based on the charge calculation, the subscribers in the telecommunication network are charged for their telecommunication connections. Moreover, the telecommunication system may comprise at least one service provider, which is also connected to the telephone exchange. The service provider is a network element providing a given service.

According to the invention, the system comprises means for transmitting connection-specific advice-of-charge data to the telecommunication terminal, and the telecommunication terminal comprises means for calculating from the advice-of-charge data the cost accumulated for the telecommunication connection. Further, according to the invention, the telecommunication terminal comprises means for presenting the calculated cost of the telecommunication connection in conjunction with the telecommunication terminal. If for some reason the advice-of-charge data is not available, e.g. because of a malfunction in the service provider's equipments, then a notice about this circumstance is transmitted to the telecommunication terminal.

In a preferred embodiment of the invention, the billing centre comprises means for generating advice-of-charge parameters and a formula describing the development of the cost of the telecommunication connection and for including said parameters and formula in the advice-of-charge data.

In some systems, such as the UMTS (Universal Mobile Telephone System), several telecommunication connections can be set up simultaneously for a single telecommunication terminal. Separate connections may be simultaneously open e.g. for speech and video. In this case, the telecommunication terminal may comprise means for calculating the cost of each telecommunication connection separately and means for presenting cost information in conjunction with the telecommunication terminal. Furthermore, the telecommunication terminal may comprise means for adding the costs of all open telecommunication connections together and presenting the total price on the terminal.

In a preferred embodiment of the invention, the billing centre is a service provider. In this case, the service provider charges the subscriber directly for telecommunication services used. This may apply e.g. to the future UMTS (Universal Mobile Telephone System) mobile communication system. The billing centre may also be a telephone exchange.

In a preferred embodiment of the invention, the telecommunication terminal comprises means for updating the cost calculation during a connection on the basis of updated advice-of-charge data.

In a preferred embodiment of the invention, the billing centre comprises means for updating the advice-of-charge data and transmitting said data to the telecommunication terminal when the rate for the telecommunication connection changes, when the bandwidth reserved for the telecommunication connection changes, upon the subscriber's request and/or periodically at predetermined intervals.

In a preferred embodiment of the invention, the billing centre comprises means for updating the cost calculation performed by the telecommunication terminal with prices calculated by the billing centre. In addition, the billing centre may comprise means for transmitting the cost accumulated for the telecommunication connection as calculated by the billing centre to the telecommunication terminal at the end of the connection.

In a preferred embodiment of the invention, the system comprises means for the activation of automatic transmission of advice-of-charge data for all calls by the billing centre, separately for each telecommunication terminal or for each call via activation by the subscriber. These means are implemented in a manner known to the skilled person, e.g. using electronics and software.

In a preferred embodiment of the invention, the telecommunication system is a digital mobile communication system.

The invention saves telecommunication network capacity. Call cost information is not transmitted continuously to the telecommunication terminal, thus allowing the capacity reserved for cost data transmission to be used for other purposes.

The invention makes it possible to present information regarding the cost of a telecommunication connection to the user of the telecommunication terminal in real time. The subscriber is continuously aware of the current cost of the connection. This opens many new possibilities for service providers and users.

LIST OF ILLUSTRATIONS

Figure 2:
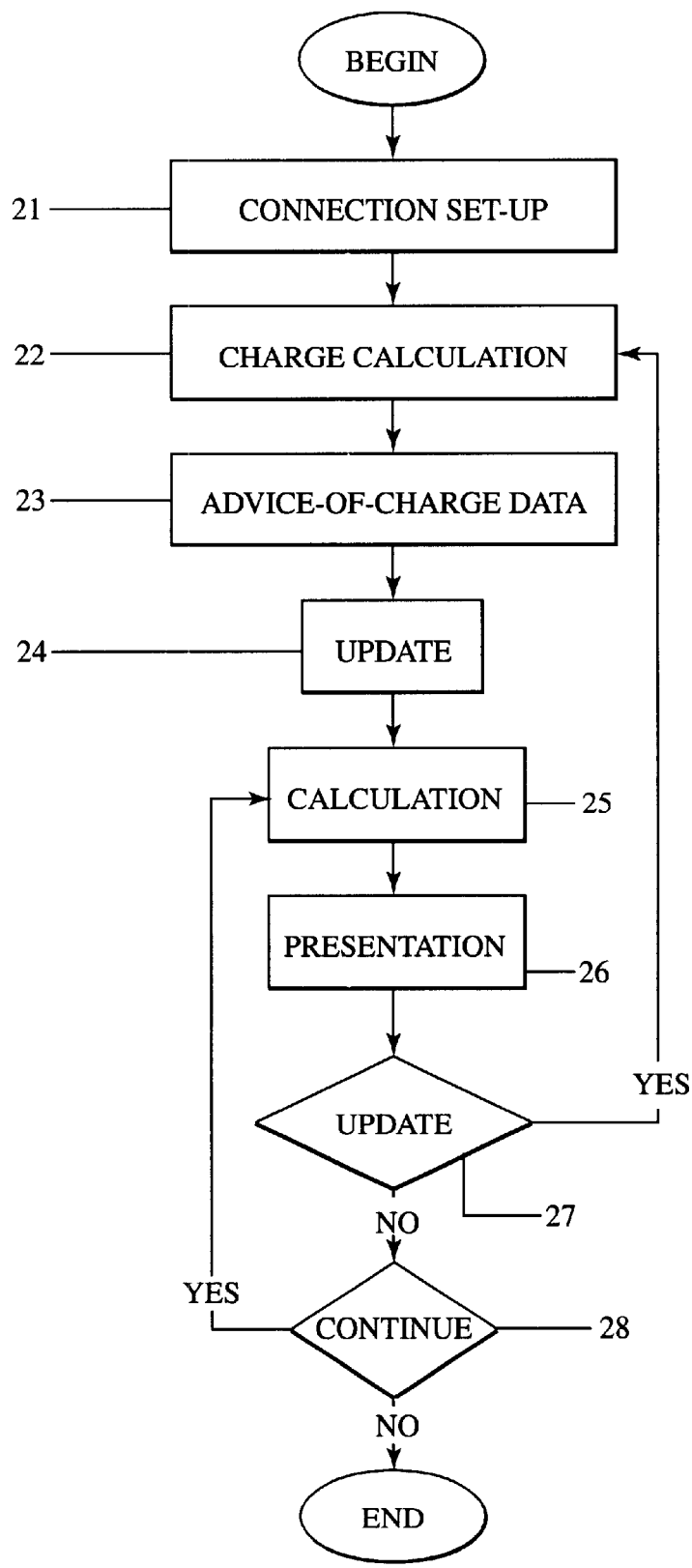

In the following, the invention will be described in detail by the aid of a few examples of its embodiments with reference to the attached drawing, wherein FIG. 1 presents an embodiment of the system of the invention, and FIG. 2 presents a functional block diagram for an example according to FIG. 1.

DETAILED DESCRIPTION OF THE INVENTION

The system illustrated in FIG. 1 comprises a mobile communication network 1, which again comprises a mobile services switching centre PK and a billing centre LK. Moreover, located in the area of the mobile communication network is a mobile station DTE, which is connected via a radio link to the mobile services switching centre PK.

In the embodiment presented in FIG. 1, a subscriber using a mobile station makes a call to another subscriber. During the call set-up, the billing centre LK generates advice-of-charge data and transmits it to the mobile station DTE. The called subscriber may belong to any telecommunication system to which a connection can be set up from the mobile services switching centre. The billing centre LK comprises means 2 for transmitting the advice-of-charge data to the mobile station and means 5 for including advice-of-charge parameters and a formula describing the development of the cost of the connection in the advice-of-charge data. These means 2 and 5 are implemented in a manner known in itself and they will therefore not be described in greater detail.

The mobile station DTE comprises means 3 for calculating the cost of the connection using the advice-of-charge data. These means 3 are implemented in a manner known to the skilled person, e.g. using electronics and software. The mobile station DTE receives the advice-of-charge data and starts calculating the cost of the connection. It continues the calculation throughout the connection and presents the calculated cost on the display 4 of the mobile station.

The billing centre LK comprises means 8 for generating updated advice-of-charge data if the rate for the telecommunication connection changes. The update is transmitted to the mobile station DTE, which comprises means 7 for receiving the update and taking it into account in calculating the cost. Furthermore, the billing centre LK comprises means 9 for generating an update of advice-of-charge data when the bandwidth is changed, and means 10 for generating an update upon the mobile subscriber's request. Moreover, the billing centre LK comprises means 11 for generating an update of advice-of-charge data periodically at predetermined intervals. This makes it possible to ensure that the cost data currently presented on the mobile station DTE are the same as the data used in the charge calculation. The above-mentioned means can also be used to inform the mobile station that no advice-of-charge data has been received from the billing centre. Thus, the mobile station can present corresponding information to the user. In the case of the example, means 7, 8, 9, 10, 11 are implemented using electronics and software.

The billing centre LK also comprises means 12 for updating the advice-of-charge data by the prices indicated by the charge calculation performed by the billing centre. This ensures that the prices presented to the mobile subscriber are the same as those actually charged. Furthermore, the billing centre LK comprises means 13 for transmitting an update to the mobile station DTE at the end of a connection. In the case of the example, these means 12, 13 are implemented using software.

When the mobile subscriber closes a connection, the mobile station DTE receives as a last advice-of-charge data update the price for the connection as calculated by the billing centre. Thus, the mobile subscriber definitely knows how much he/she will be charged for the call just finished.

FIG. 2 presents a functional block diagram for a system according to FIG. 1. A mobile subscriber who wants to call another subscriber starts call set-up by entering the called subscriber's telephone number on his/her mobile station DTE and sends a connection set-up command to the telephone exchange PK.

The telephone exchange PK establishes a connection between the calling subscriber (A-subscriber) and the called subscriber (B-subscriber), block 21, whereupon the billing centre LK starts calculating the charge and generates advice-of-charge data, block 22. The advice-of-charge data is sent to the mobile station DTE, block 23.

In block 24, the mobile station DTE updates its connection cost calculation by the advice-of-charge data received and goes on to block 23, where the cost of the connection up to a given instant is calculated. From block 25, action goes on to block 26, where the call price is presented to the subscriber on the display of the mobile station.

Next, a test is carried out to establish whether any changes affecting the price have occurred in the telecommunication connection between the calling and called parties and whether any update information to be transmitted to the mobile station DTE exists in the billing centre LK, block 27. If e.g. the bandwidth is changed, then the price data are also changed. In this case, the billing centre generates an update, block 22, which is transmitted further to the mobile station, block 23. In the mobile station, the price data updates sent by the billing centre are taken into account, block 24, and the calculation is continued using the new data, block 25.

The advice-of-charge data are also updated if cheaper rates become valid during the connection, if the caller requests an update or if the billing centre LK has been programmed to send updates for some other reason. If there is no reason to update the data, then a test is performed to determine whether the telecommunication connection is still active, block 28. If the connection is active, then the procedure loops back to price calculation, block 25. If the call has been disconnected, then price calculation is stopped, too.

A system as illustrated in FIG. 1 may also be implemented by placing the billing centre LK in the network element of a service provider SP, in which case the subscriber is charged directly for all services used. This may be the case e.g. in an UMTS mobile communication system.

In the example presented in FIG. 2, the mobile station DTE could also have had other telecommunication connections active at the same time. In this case, the costs of all the connections could have been calculated separately and added together. Thus, the user of the mobile station could have chosen which price data to see.

The calculation of the price of a telecommunication connection to be presented to the user according to the invention can be implemented e.g. so that the price presented to the subscriber is always the same as or higher than the price to be charged. This ensures that the subscriber will not be charged more than the amount presented to him/her on the telecommunication terminal.

The invention is not restricted to the examples of its embodiments described above, but many variations are possible within the scope of the inventive idea defined in the claims.

What is claimed is:

1. Method for presenting the price of a telecommunication connection on the telecommunication terminal of the committer of the telecommunication connection in a telecommunication system comprising a telephone exchange, a telecommunication terminal communicating with the telephone exchange via a telecommunication network and a billing centre, which is connected to the telephone exchange and which takes care of charge calculation in the network, the method comprising: connection-specific advice-of-charge data to the telecommunication terminal at the beginning of the telecommunication connection; using the telecommunication terminal, a price for the telecommunication connection is calculated from the advice-of-charge data; the calculated price of the telecommunication connection is presented on the telecommunication terminal; and the price calculated for the telecommunication connection by the telecommunication terminal is corrected during the connection via advice-of-charge data updates from the billing centre, and an advice-of-charge data update is sent to the telecommunication terminal when the bandwidth reserved for the telecommunication connection changes.

2. Method as defined in claim 1, wherein the advice-of-charge data comprises a formula describing the development of the cost of the telecommunication connection and the advice-of-charge parameters required for the formula.

3. Method as defined in claim 1, wherein, if more than one telecommunication connection is set up, then a price is calculated for each telecommunication connection by means of the telecommunication terminal and the price of each connection is presented separately on the telecommunication terminal.

4. Method as defined in claim 1, wherein the prices of all the telecommunication connections are added together by means of the telecommunication terminal and this total price is presented on the telecommunication terminal.

5. Method as defined in claim 1, wherein the billing centre is a service provider.

6. Method as defined in claim 1, wherein the billing centre is a telephone exchange.

7. Method as defined in claim 1, wherein an advice-of-charge data update is sent to the telecommunication terminal when the rate for the telecommunication connection changes.

8. Method as defined in claim 1, wherein an advice-of-charge data update is sent to the telecommunication terminal upon request.

9. Method as defined in claim 1, wherein the advice-of-charge data update is sent to the telecommunication terminal periodically at intervals of a predetermined length.

10. Method as defined in claim 1, wherein the price calculated for the telecommunication connection by the telecommunication terminal is updated by the price of the telecommunication connection as calculated by the billing centre.

11. Method as defined in claim 1, wherein the billing centre is programmed to transmit the cost accumulated for the telecommunication connection to the telecommunication terminal at the end of the connection.

12. Method as defined in claim 1, wherein the subscriber is charged for the telecommunication connection on the basis of charge calculation performed by the billing centre.

13. Method as defined in claim 1, wherein the advice-of-charge data is transmitted to the telecommunication terminal using advice-of-charge (AOC) auxiliary services.

14. Method as defined in claim 1, wherein the transmission of advice-of-charge data is activated automatically for all calls by the billing centre, for each telecommunication terminal or for each call via activation by the user.

15. Method as defined in claim 1, the telecommunication system is a digital mobile communication system.

16. System for presenting the price of a telecommunication connection on the telecommunication terminal of the committer of the connection in a telecommunication system comprising a telephone exchange, a telecommunication terminal communicating with the telephone exchange via a telecommunication network and a billing centre, which is connected to the telephone exchange and takes care of charge calculation in the network, wherein the billing centre comprises means for transmitting connection-specific advice-of-charge data to the telecommunication terminal; the billing centre further comprises means for updating the advice-of-charge data and transmitting said data to the telecommunication terminal when the bandwidth reserved for the telecommunication connection, changes; the telecommunication terminal comprises means for calculating from the advice-of-charge data a price accumulated for the telecommunication connection; the telecommunication terminal comprises means for presenting the price calculated for the telecommunication connection in conjunction with the telecommunication terminal; and the telecommunication terminal comprises means for updating the price calculation on the basis of advice-of-charge data updated during the connection.

17. System as defined in claim 16, wherein the billing centre comprises means for generating a formula describing the price development of the telecommunication connection and the advice-of-charge data parameters belonging to the formula and for including said formula and parameters in the advice-of-charge data.

18. System as defined in claim 16, wherein the telecommunication terminal comprises means for calculating a separate price for each telecommunication connection if more than one telecommunication connection is set up, and means for presenting all price information in conjunction with the telecommunication terminal.

19. System as defined in claim 16, wherein the telecommunication terminal comprises means for adding the prices of all telecommunication connections together and means for presenting the total price on the telecommunication terminal.

20. System as defined in claim 16, wherein the billing centre is a service provider.

21. System as defined in claim 16, wherein the billing centre is the telephone exchange.

22. System as defined in claim 16, wherein the billing centre comprises means for updating the advice-of-charge data and transmitting said data to the telecommunication terminal when the rate for the telecommunication connection changes.

23. System as defined in claim 16, wherein the billing centre comprises means for updating the advice-of-charge data and transmitting them to the telecommunication terminal upon request.

24. System as defined in claim 16, wherein the billing centre comprises means for updating the advice-of-charge data and transmitting the data to the telecommunication terminal periodically at intervals of predetermined length.

25. System as defined in claim 16, wherein the billing centre comprises means for updating the price calculation performed by the telecommunication terminal by the price of the telecommunication connection as calculated by the billing centre.

26. System as defined in claim 16, wherein the billing centre comprises means for transmitting the price accumulated for the telecommunication connection as calculated by the billing centre to the telecommunication terminal at the end of the telecommunication connection.

27. System as defined in claim 16, wherein the system comprises means by which the transmission of advice-of-charge data is activated automatically for all calls by the billing centre, separately for each telecommunication terminal or separately for each call via user activation.

28. System as defined in claim 16, wherein the telecommunication system is a digital mobile communication system.

* * * * *